United States Patent [19]
Persson

[11] Patent Number: 5,881,150
[45] Date of Patent: Mar. 9, 1999

[54] HINGE MECHANISM HAVING A SOUND GUIDE

[75] Inventor: Per-Håkan Persson, Kävlinge, Sweden

[73] Assignee: Telefonaktiebolaget LM Ericsson, Stockholm, Sweden

[21] Appl. No.: 919,365

[22] Filed: Aug. 28, 1997

[30] Foreign Application Priority Data

Aug. 29, 1996 [SE] Sweden ................................. 9603135

[51] Int. Cl.[6] ...................................................... H04M 1/00
[52] U.S. Cl. ............................................ 379/433; 379/434
[58] Field of Search .................................... 379/428, 433, 379/434; 455/90, 575, 347; 16/303, 229, 329, 386, 341

[56] References Cited

U.S. PATENT DOCUMENTS 5,274,882  1/1994  Persson ..................................... 16/303
5,761,300  6/1998  Domoleczny ........................... 379/433

FOREIGN PATENT DOCUMENTS

0 275 996 A2  7/1988  European Pat. Off. .
WO97/42746  11/1997  WIPO .

Primary Examiner—Jack Chiang
Attorney, Agent, or Firm—Burns, Doane, Swecker & Mathis, L.L.P.

[57] ABSTRACT

The present invention relates to a hinge mechanism which provides a tight sound guide joint in a sound guide (13) which is split between a communication unit (11) and a foldable flip part (12). At least two shaft elements (21, 22) pivotally connect the flip part to the communication unit. Each shaft element is arranged in a respective pivot point (26, 27) for the flip part along the pivot axis (25) of the flip part. The sound guide joint is arranged in a first pivot point (26) for the flip part between an opposing surface on the flip part and an opposing surface on the communication unit. The sound guide parts (13a, 13b) are thereby connected to each other irrespective of which pivot position the flip part takes up relative to the communication unit. The hinge mechanism comprises at least one compressive resilient element (32), which, via a shaft element (22) in a second pivot point (27), exerts a force on the two opposing surfaces so that the sound guide joint is pressed together and becomes sound-tight.

24 Claims, 8 Drawing Sheets

HINGE MECHANISM HAVING A SOUND GUIDE

TECHNICAL FIELD

The present invention relates to a hinge mechanism for a hand-held communication unit, e.g. a mobile telephone, with a folding cover. More precisely, the invention relates to a hinge mechanism which provides a tight sound guide joint on a sound guide which is divided between the cover and the communication unit.

STATE OF THE ART

In the technical field of wireless telephony developments are leading towards smaller and smaller telephones. The present smallest size is less than the distance between ear and mouth. The speech end therefore does not come sufficiently near to the mouth for a good sound quality to be obtained. Interfering noise from the surroundings is also picked up. Such small telephones can therefore be equipped with a flip part which can be folded out from the speech end of the telephone and which picks up the speech, a so-called passive flip part.

In order to obtain better sound quality the foldable flip part can comprise a sound guide in the form of an air passage/air tunnel which guides the picked-up sound to a microphone inside the body of the telephone. Such a foldable cover is called a semi-active flip part. Normally the sound guide is manufactured from a rigid material, wherefore the sound guide must be split between the flip part and the body of the telephone. A split sound guide makes it possible to remove the flip part from the telephone body, if so desired.

There are also telephones with the microphone placed right out on the flip part in order to come closer to the mouth, a so-called active flip part. A disadvantage of such a construction is that the sensitivity to interference and the physical vulnerability increase. The construction of a telephone with an active flip part is even more complicated to manufacture and thereby more expensive.

In a telephone with a semi-active flip part with a split sound carrier it is important that the joint of the split sound guide is tight so that no interfering sound from the surroundings is guided to the microphone and so that no speech is unnecessarily guided away from the sound guide.

Patent Application SE 9601701-7 describes a communication unit, e.g. a mobile telephone, with a semi-active flip part, where the sound guide is designed in one single piece through the flip part and through the telephone body up to a microphone in the telephone body. The sound guide is manufactured from some flexible material, e.g. silicon, textile or cloth. As the sound guide is manufactured in a single piece, there is no joint where noise can come in or speech can leak out. Owing to this the flip part is not detachable.

A telephone with a foldable flip part has some form of hinge mechanism which fastens the flip part to the telephone so that the flip part is pivotally movable in relation to the body of the telephone.

Typical hinge mechanisms consist at least of three parts, whereof two hinge parts are comprised in one part of the apparatus, and one hinge part is comprised in another part of the apparatus. Some form of hinge axis runs through the parts of the hinge, whereby the two parts of the apparatus are allowed to rotate in relation to each other with the axis of the hinge as the pivot axis.

It is desirable in a telephone with a semi-active flip part that the flip part can take up a distinct folded-out stop position and a closed stop position. It is also desirable that the flip part attempts to take up a stop position when it is situated between two stop positions, whereby its movement towards the stop position will be even and smooth.

U.S. Pat. No. 5,274,882 describes a hinge mechanism which holds the hinge parts in predetermined positions in relation to each other. The hinge parts are designed with male and female-connecting elements and a spring between the two hinge parts which presses the male-connecting elements towards the female-connecting elements. The male- and female-connecting elements connect into each other when the flip part is in the folded-out position.

European Patent Application EP 0 275 996 B1 describes a telephone with a semi-active flip part. A microphone is arranged in the body of the telephone in the vicinity of the hinge mechanism. There is a sound guide in the flip part which guides the sound from the flip part via a sound guide in the body of the telephone which leads into the microphone. The joint of the sound guide is arranged between the outer casing of the hinge mechanism and the body of the telephone. When the flip part is in the maximal folded-out position, the openings from the sound guide in the flip part and the sound guide in the body of the telephone are directly in front of each other. Sealing material can be introduced around the joint of the sound guide to prevent interfering sound leaking into the microphone.

A disadvantage of this construction is that the sound guide in the flip part is connected only to the sound guide in the position when the flip part is maximally folded out. If the flip part is dislodged from this position, there is no longer any sound guide connection.

DISCLOSURE OF THE INVENTION

The present invention deals with a problem of how hinge arrangements which connect a communication unit with a semi-active flip part should be designed so that the joint of a split sound guide will be isolated from ambient noise.

A further problem is how the flip part should be made to be able to take up distinct stop positions at the closed position and the speak position and how to enable the user to displace the flip part from a stop position at the same time as the different parts of the split sound guide are in contact with each other all the time. Another problem is how the hinge mechanism should be designed so that the flip part will be able to be easily removed from the communication unit and replaced again.

Another problem is that the hinge mechanism should be easy and cost-effective to manufacture and to mount on the communication unit and the flip part.

One object of the present invention is consequently to design a hinge mechanism which connects a communication unit to a foldable semi-active flip part so that the joint which is present in a sound guide split between the flip part and the communication unit will be isolated from ambient sound.

A further object is that the flip part should be attachable and removable, and be able to take up a closed and an open position and that the movement between these positions should be even, at the same time as the different parts of the split sound guide should be in contact with each other, irrespective of which rotational position the flip part takes up.

Another object is that the hinge mechanism should be simple and cost-effective to manufacture and mount and that it should fulfill long-term quality requirements.

The above problems are solved by arranging the sound guide joint of a split sound guide in a pivot point for the flip part in a communication unit with a folding flip part. The hinge arrangement comprises at least two shaft elements which pivotally connect the flip part to the communication unit. At least one of the shaft elements exerts a pressure against the sound guide joint which is thereby pressed together and made tight.

In more detail the problems are solved by arranging the joint of the sound guide in a first pivot point for the flip part between an opposing surface on the flip part and an opposing surface on the communication unit. The two sound guide parts are thereby connected to each other independent of the pivotal position of the flip part relative to the communication unit. The flip part pivots relative to the communication unit around at least two pivot points which lie along a pivoting axis. In at least one of the two pivoting points, a shaft element is arranged at a hinge part and fitted into a respective cavity in an opposing hinge part so that the flip part is pivotally connected to the communication unit. At least one of the shaft elements is influenced by a resilient compressive force in the direction of the pivot axis. This shaft element can itself form a resilient compressive element, e.g. a rubber detail, or be influenced directly or indirectly by a resilient element, e.g. a mechanical spring. Said shaft element can, for example, be axially movable and comprised in a hinge part in the flip part or in the communication unit. The shaft element can then be in contact with a resilient compressible element which exerts pressure in the direction of the pivot axis towards the shaft element. The resilient force influences the shaft element so that it in turn exerts pressure on one of the opposing surfaces. This one of the opposing surfaces then presses against the other opposing surface. A tight sound guide joint is obtained independent of the pivoting position of the flip part relative to the communication unit.

One advantage of the invention is that the joint of a split sound guide is tight at the same time as the flip part is pivotable relative to the communication unit, irrespective of which pivoting position the flip part takes up relative to the communication unit. The hinge mechanism can also be designed so that the flip part is removable from the communication unit.

A further advantage is that a hinge arrangement according to the invention is easy to manufacture and to mount and is therefore cost-effective.

The invention will now be described more closely with the help of preferred embodiments and with reference to the enclosed drawings.

PREFERRED EMBODIMENTS

Figure 1:
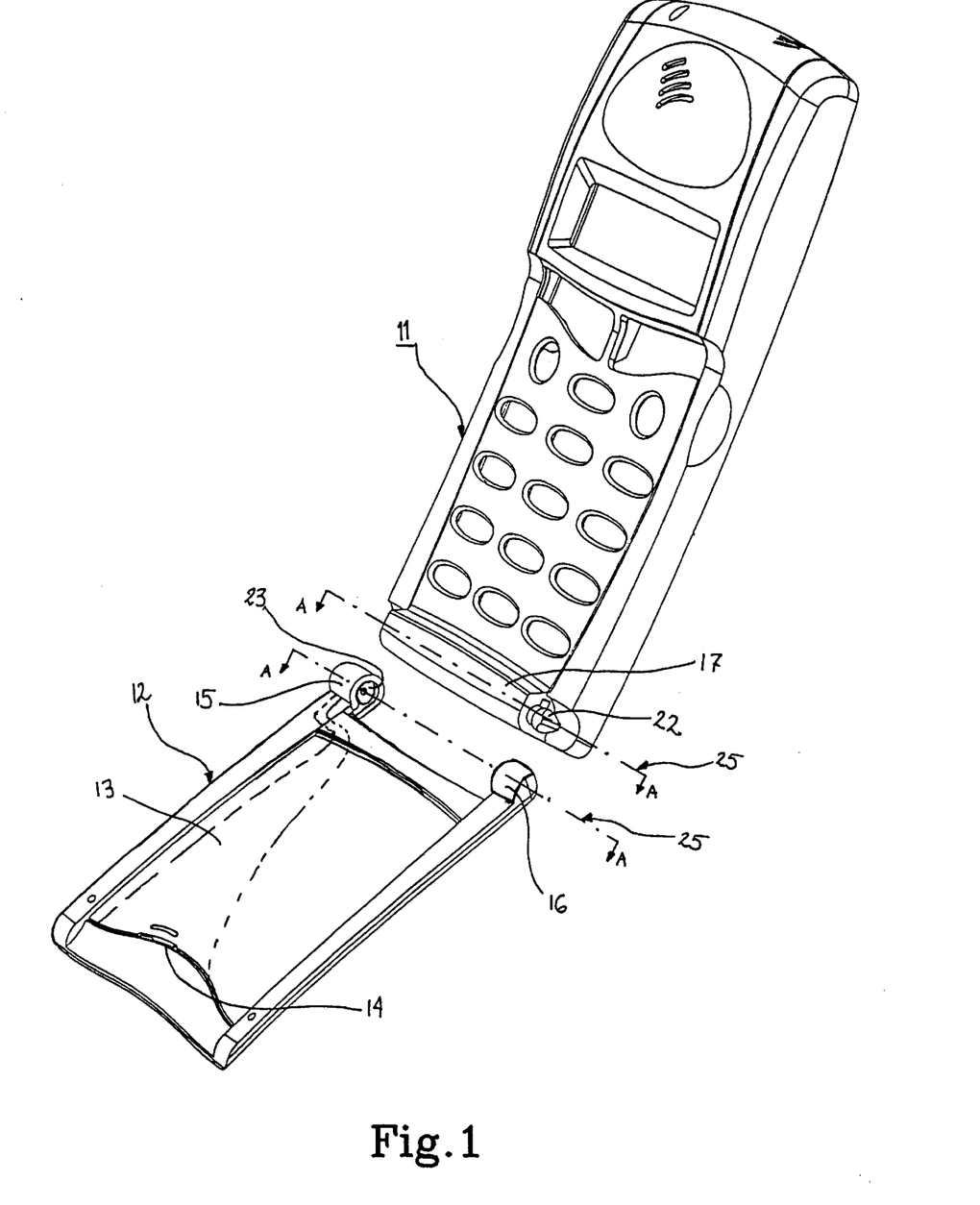
FIG. 1 and FIG. 2 show two different perspective views of a communication unit with a semi-active flip part comprising a three-part hinge mechanism according to the invention, wherein the flip part is separated from the body of the telephone.
Figure 2:
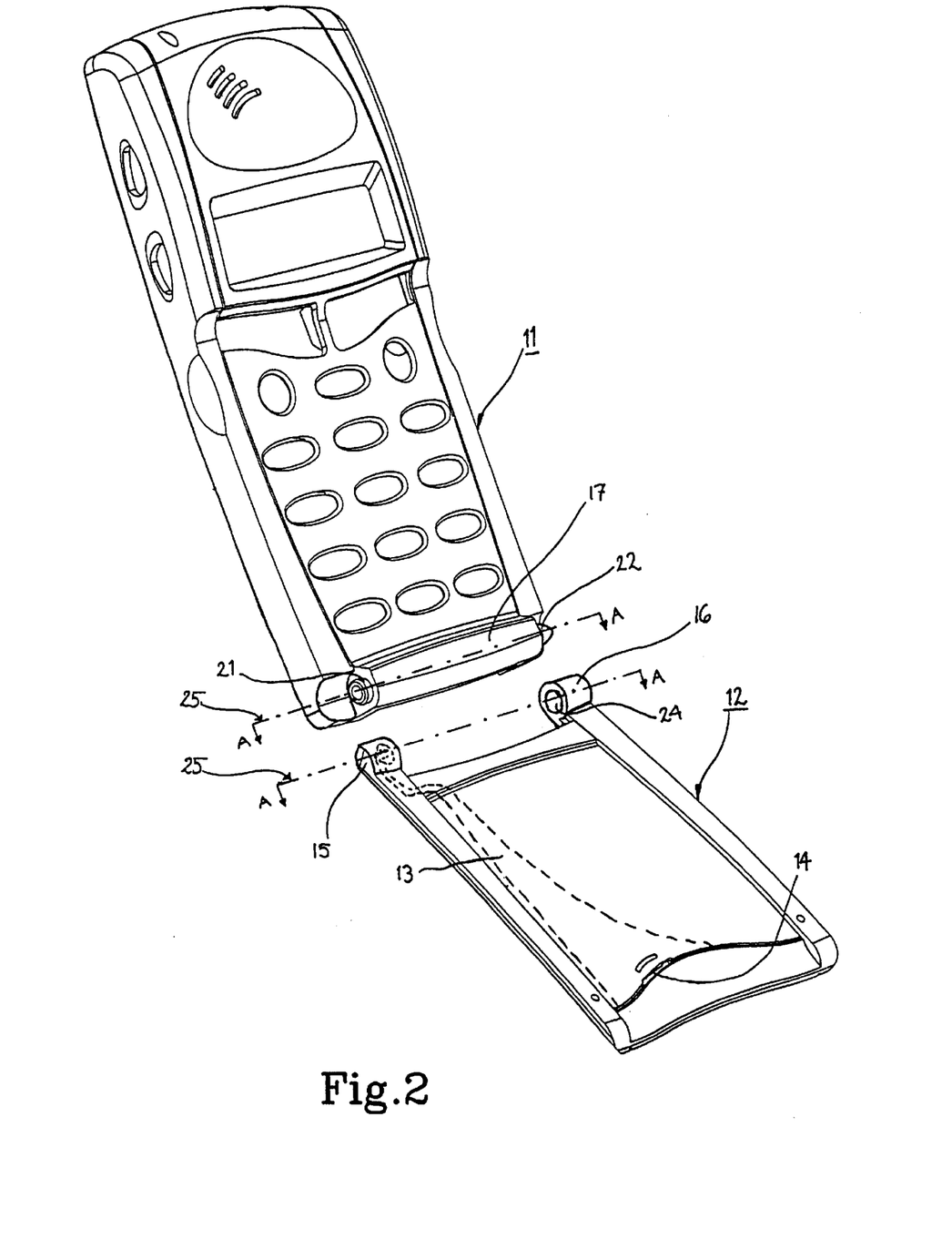

FIG. 1 and FIG. 2 show two different perspective views of an embodiment of the invention, where the communication unit 11 is a mobile telephone. The communication unit has a folding, so-called semi-active flip part. A split sound guide guides sound via a first sound guide part 13a from a sound input 14 in the form of an opening in the lower part of the flip part and via a second sound guide part 13b to a microphone (see FIG. 3) inside the communication unit. The semi-active flip part 12, which in FIG. 1 and 2 is shown when it is removed from the communication unit, has at one end two projecting parts which form a first outer hinge part 15 and a second outer hinge part 16 arranged opposite the first hinge part. The lower part of the communication unit comprises an inner hinge part 17. This inner hinge part is fitted into a space between the first and the second outer hinge parts 15 and 16.

Figure 3:
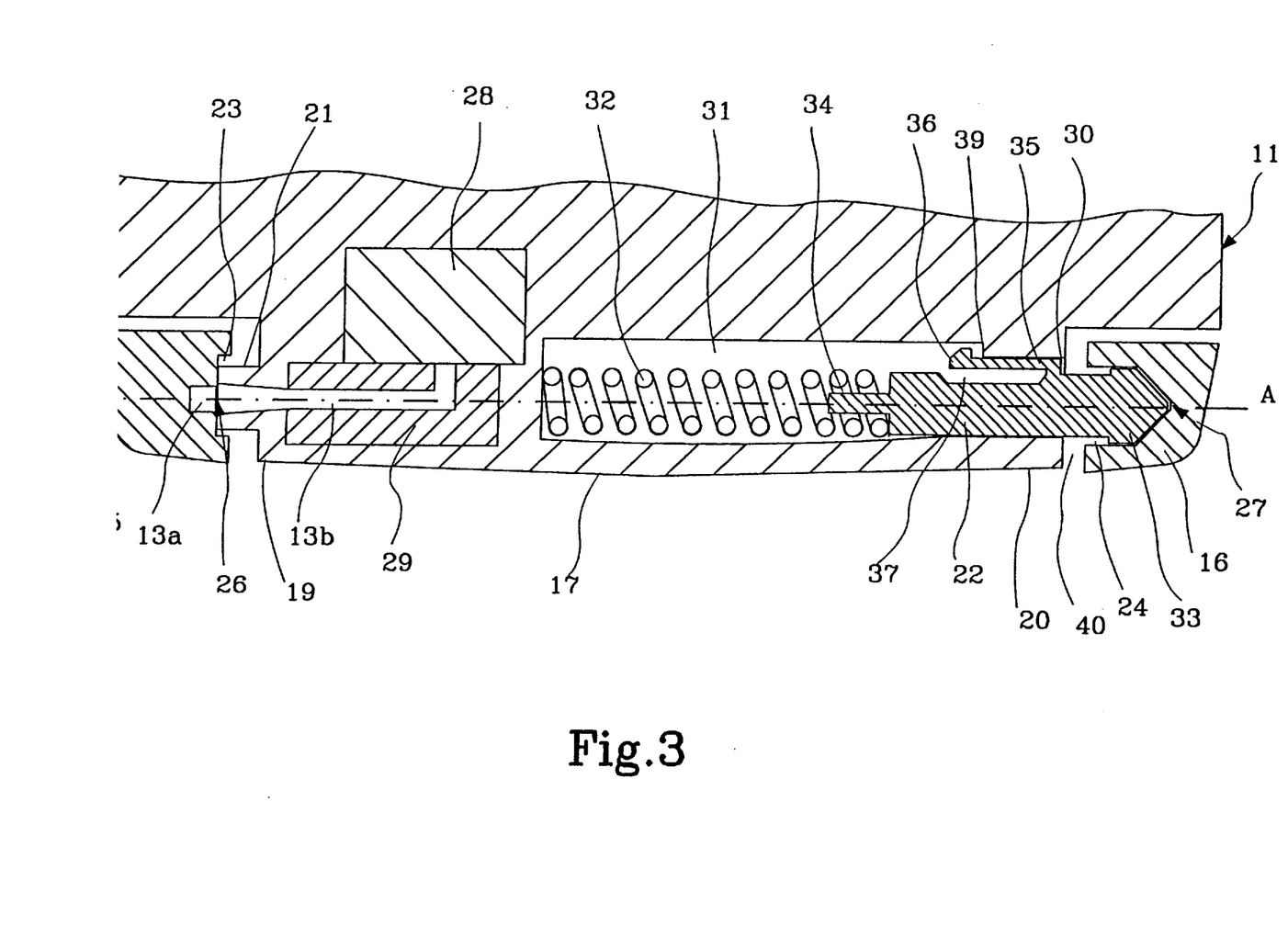
FIG. 3 shows in cross-section a three-part hinge mechanism according to the invention with the flip part in the folded-out position.

FIG. 3 shows in cross-section the hinge mechanism according to the invention as if the communication unit were sectioned in its longitudinal direction and thereafter seen from straight in front. In the Figure the section is indicated by the dotted line A—A. In the Figure the flip part takes up a predetermined folded-out position. At a first end 19 of the inner hinge part 17 there is a first projecting fixed shaft element in the form of a cylindrical shaft pin 21, and at a second end 20 of the inner hinge part there is a second movably projecting shaft element in the form of a plunger 22. The two shaft elements 21 and 22 cannot rotate in relation to the inner hinge part 17, but the plunger is movable in its axial direction.

In each of the first and the second outer hinge parts 15 and 16 there is a respective cavity 23 and 24 into which the first and the second projecting shaft elements 21 and 22 respectively, are fitted. The first and the second outer hinge part 15 and 16 can thereby rotate in relation to the inner hinge part around a pivot axis 25, which extends through the three hinge parts 15, 16 and 17 and through the two shaft elements 21 and 22, whereby the flip part 12 either can be folded out from, or in towards, the communication unit 11.

The flip part 12 has a first pivot point 26 where the pivot axis 25 cuts the bottom surface in the cavity 23 of the first outer hinge part and a second pivot point 27 where the pivot axis 25 cuts the bottom surface in the cavity 24 of the second outer hinge part.

The sound guide 13 runs from said sound input 14 through the flip part into a microphone 28 in the communication unit. The sound guide 13 is split and consists of a first part 13a in the flip part and a second part 13b in the communication unit. Said shaft pin 21, which projects in the direction towards the first outer hinge part 15, is in the present case rigidly joined with the first end 19 of the inner hinge part 17. In the end surface of the shaft pin 21, in the direction of the pivot axis, the second end 13b of the sound guide begins. The second sound guide part is in the present example comprised in a rubber detail 29 in order to shut out ambient sound. The cavity 23 of the first outer hinge part 15 is shaped to fit around the shaft pin 21, and the first sound guide part 13a opens out into the bottom surface of the cavity, in the pivot point for the flip part. The bottom surface of the cavity and the end surface of the shaft pin form opposing surfaces towards each other.

Consequently, the sound guide joint is arranged between the bottom surface in the cavity 23 of the first outer hinge part and the end surface of the shaft pin, i.e. in the pivot point 26 for the flip part. Irrespective of how the flip part rotates in relation to the communication unit around the pivot axis 24, the two sound guide parts 13a and 13b are connected to each other.

In the second end 20 of the inner hinge part 17 there is, in the direction of the pivot axis, a hole 30 which leads into a cavity 31. In the cavity, a resilient element 32, which in the present example is a mechanical helical spring, is arranged in the direction of the pivot axis so that one end thereof is in contact with an end surface of the cavity. Said plunger 22 is partly inserted through the hole 30, whereby a first end 33 of the plunger projects out of the hole 30 in the direction of the pivot axis towards the second outer hinge part 16. The projecting part of the plunger forms the second shaft element. A second end 34 of the plunger forms a projecting pin which is inserted in the helical spring 32 in the direction of the pivot axis.

Figure 4:
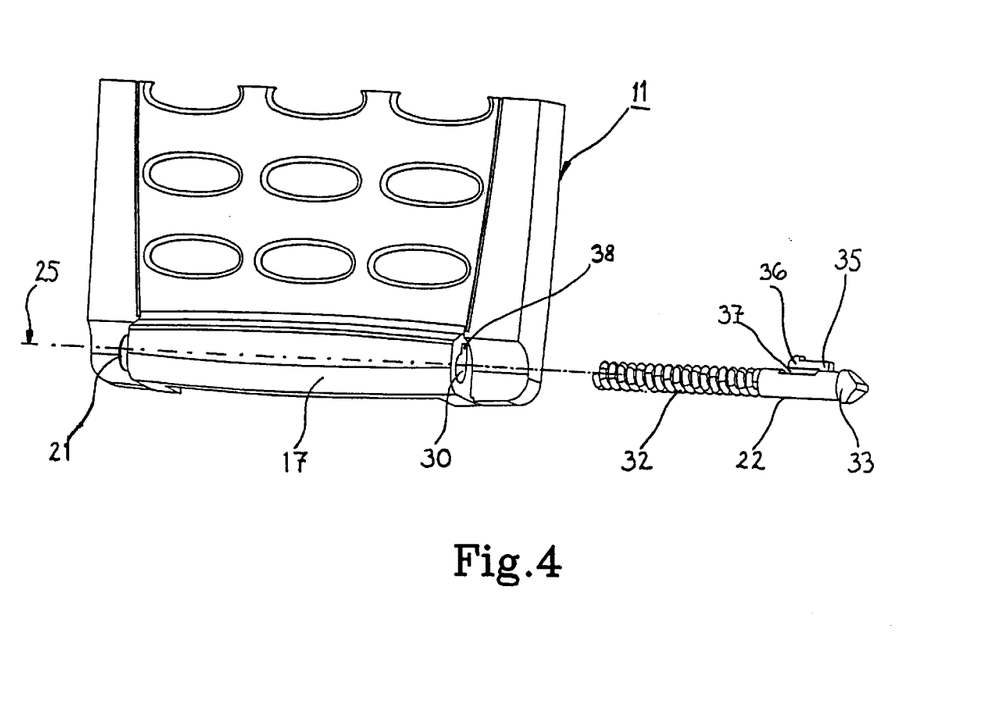
FIG. 4 shows a perspective view of a helical spring and a plunger according to the invention before they are placed in the communication unit.

In order to prevent the plunger 22 from moving in the direction of the pivot axis out of the inner hinge part 17 when the flip part is removed, and in order to prevent the plunger 22 from rotating in relation to the inner hinge part, a locking hook 35 is arranged on the plunger. FIG. 4 shows in a perspective view the plunger 22 and the spring 32 before they have been inserted in the hole 30 of the inner hinge part. The locking hook 35 extends along the plunger 22 in the direction towards its projecting pin 34 and ends with a projecting locking part 36. The locking hook 35 can be pressed towards a cut-out 37 in the plunger 22 during insertion in the hole 30. The hole is so shaped that it comprises a notch 38 into which the part of the locking hook 35 extending along the plunger 22 is fitted. In this way the plunger cannot rotate around the pivot axis in relation to the inner hinge part after the locking hook has been fitted into the notch.

The cavity 31 in the inner hinge part is wider than the hole 30, as is shown in FIG. 3, and therefore there is an edge 39 where the hole opens out into the cavity. When the locking hook 35 is inserted sufficiently far so that the projecting part is in the cavity, the locking hook springs out from the plunger. The projecting part 36 will then hook onto the edge 39 if the plunger moves sufficiently far in the direction towards the second outer hinge part. In this way the plunger can be prevented from moving completely out of the inner hinge part after it has been inserted into it. The spring and the plunger can in this way be easily mounted in the inner hinge part by being pressed from outside into the cavity.

When the plunger is inserted in the hole and the flip part is mounted on the communication unit, the spring 32 is in contact with the plunger 22. In this case the spring exerts a force on the plunger in a direction towards the second hinge part 16. The plunger 22 thereby exerts a force on the second outer hinge part 16 so that this is pressed in the direction of the pivot axis away from the second end 20 of the inner hinge part. This means that the whole flip part 12 is pressed in the same direction as the second outer hinge part 16, whereby the first outer hinge part 15 is pressed towards the first end 19 of the inner hinge part. The shaft pin 21 of the inner hinge part 17 then presses towards the bottom surface in the cavity 23 of the first outer hinge part 15, whereby the two opposing surfaces in the sound guide joint are pressed together so that the sound guide joint becomes sound-tight. Because the sound guide joint is arranged in a pivot point, it is tight irrespective of which pivot position the flip part takes up in relation to the communication unit.

In the present example the projecting end of the plunger is V-shaped and the cavity 24 of the second hinge part has a V-shaped notch. The V-shaped end of the plunger and the V-shaped notch form so-called male and female-connecting elements. The V-shaped end can take up a first and a second position, which are separated by 180° where it is aligned into the V-shaped notch. The flip part is only allowed to pivot 180° around the pivot axis. A continued movement is prevented, on the one hand, by the upper end of the flip part contacting the communication unit in the folded-in position and, on the other hand, by the flip part contacting the lower end of the communication unit when folded out approximately 180° from the folded-in position. In this way the V-shaped end can only be aligned into the V-shaped notch in the first position when the flip part is in its folded-out position. The flip part can be moved from the folded-in position to the folded-out position by pressure from the hand of the user.

When the V-shaped end is closer to one aligned position than the other aligned position, it attempts to achieve alignment. When the flip part is folded in, it is closer to the second position in which the V-shaped end is aligned in the notch. The flip part is prevented from taking up the desired position but attempts to achieve it and therefore the flip part is held in place in contact with the communication unit. The attempt of the V-shaped end to align itself with the V-shaped notch makes the flip part moving smoothly between the folded-out and folded-in positions.

The use of male and female-connecting elements in order to achieve an even movement between a number of stop positions, as in the invention, is described more closely in the earlier mentioned U.S. Patent Specification No. 5,274,882. As is evident from said patent document, the shape of the male and female-connecting elements can be different, e.g. U-shaped. If more stop positions are desired, the female-connecting element, i.e. the cavity in the second outer hinge part, can comprise several notches. The shape of the male-connecting element does not have to correspond to the shape of the female-connecting element. A U-shaped point in a V-shaped notch also gives a corresponding pivoting movement with precise stop positions.

When the spring 32 presses the plunger 22 towards the second outer hinge part 16, a free space 40 is formed between the second end 20 of the inner hinge part and the second outer hinge part 16. The free space 40 can be pressed together if the second outer hinge part is subjected to sufficient pressure, e.g. from the hand of the user, so that the spring is compressed. When the free space 40 is pressed together, the first outer hinge part 15 can be pivoted off from the shaft pin 21, whereafter the second outer hinge part 16 can be drawn away from the V-shaped end 33 of the plunger. The flip part 12 can in this way be removed from the communication unit 11.

The flip part can thereby be exchanged for another flip part with, for example, another appearance. The new flip part is fastened on the communication unit by first threading the second outer hinge part 16 onto the plunger 22, whereafter the plunger is pressed towards the spring 32 so that the free space 40 is compressed. Thereafter the first outer hinge part 15 can be pivoted on the shaft pin 21.

Figure 5:
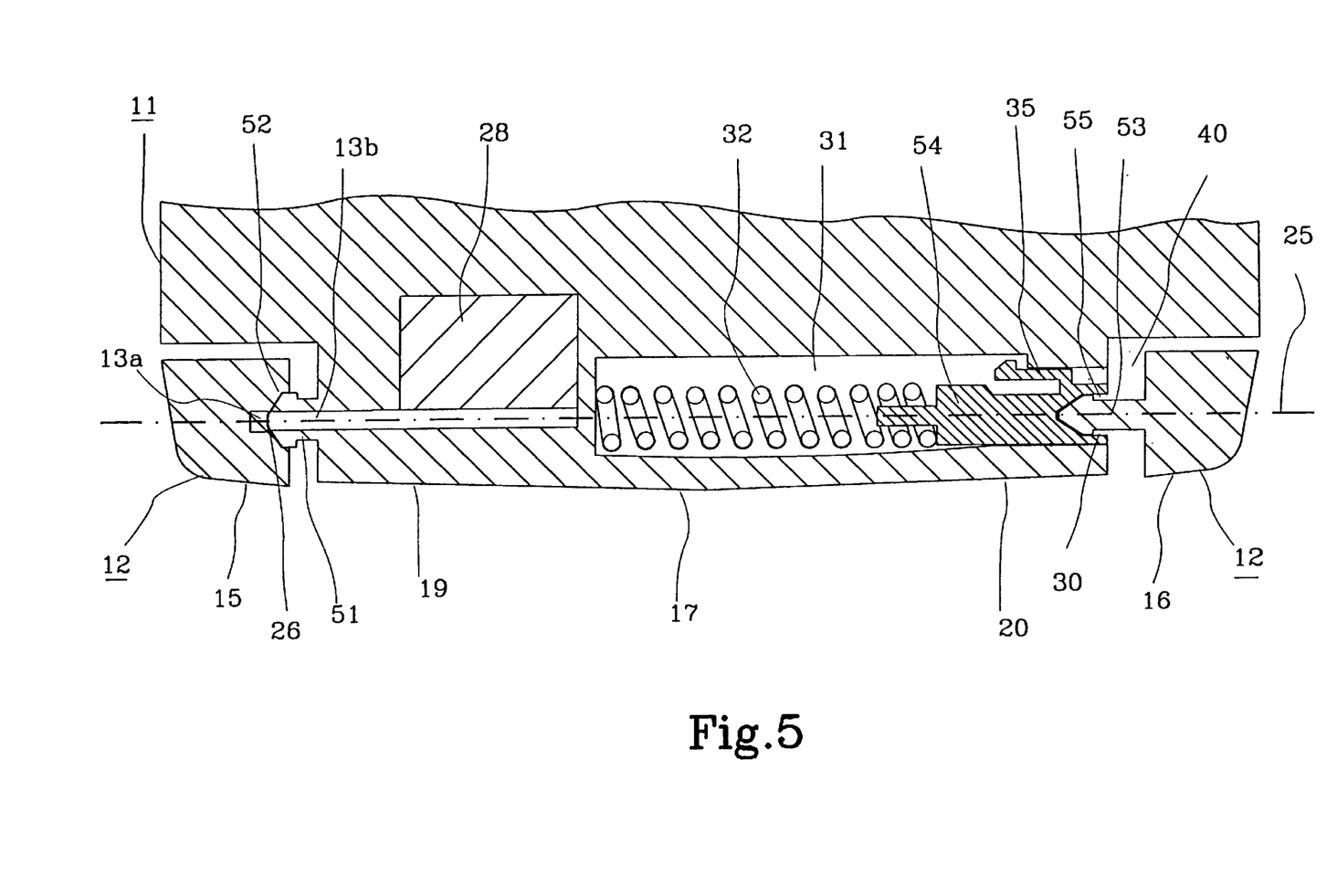
FIG. 5 shows in cross-section an embodiment of a three-part hinge mechanism according to the invention.

FIG. 5 shows a further embodiment of a three-part hinge mechanism according to the invention with a first and a second outer hinge part and an inner hinge part, where the sound guide joint is arranged in the pivot point for the flip part. The same reference numerals have partially been used as in FIG. 3. The two outer hinge parts 15 and 16 are, as in the previous case, arranged on the flip part 12 and the inner hinge part 17 is arranged on the communication unit 11. A first fixed shaft element 51, the end surface of which is V-shaped, projects out from a first end 19 of the inner hinge part 17 and is joined therewith. The first shaft element is fitted into a V-shaped cavity 52 comprised in the first outer hinge part 15. The sound guide joint is comprised in the first pivot point for the flip part 26, between the end surface of the first shaft element 51 and the bottom surface of the cavity 52, which surfaces form each other's opposing surfaces. A first sound guide part 13a leads from the flip part to the bottom surface of the cavity 52, and a second sound guide part 13b leads from the end surface of the shaft element 51 to a microphone 28 inside the communication unit 11.

The second outer hinge part 16 comprises a fixed projecting shaft element 53 of which the end is V-shaped. The second end 20 of the inner hinge part 17 comprises a hole 30 which leads into a cavity 31. In the cavity a helical spring 32 is arranged in the same way as described above in connection with FIG. 3. A plunger 54 which is movable in the axial direction, is in contact with s first end of the helical spring 32. The second end of the plunger, which is directed towards the second outer hinge part 16, is arranged in the hole 30 and comprises a cavity 55 with a V-shaped notch. The second shaft element 53 is fitted into the cavity 55 of the plunger. The plunger 54 comprises a locking hook 35 which is shaped in the same way as the locking hook in FIG. 3.

The plunger 54 is pressed by the spring 32 towards the second outer hinge part 16, whereby the cavity 55 of the plunger presses towards the second shaft element 53. The second outer hinge part 16 then presses in the direction of the pivot axis away from the second end 20 of the inner hinge part. The first outer hinge part 15 in this way presses in the direction towards the first end 19 of the inner hinge part 17, whereby the shaft element 51 projecting from the inner hinge part 17 presses towards the bottom surface in the cavity 52 in the first outer hinge part 15. The two opposite surfaces in the sound guide joint in the first pivot point 26 are thereby pressed towards each other. In this way the sound guide joint becomes tight.

When the second outer hinge part 16 is pressed in the direction from the second end 20 of the inner hinge part 17, a free space 40 is formed between said hinge parts. The flip part 12 can thereby easily be removed from the communication unit 11 and fitted into place according to what has been earlier described in connection with FIG. 3.

Figure 6:
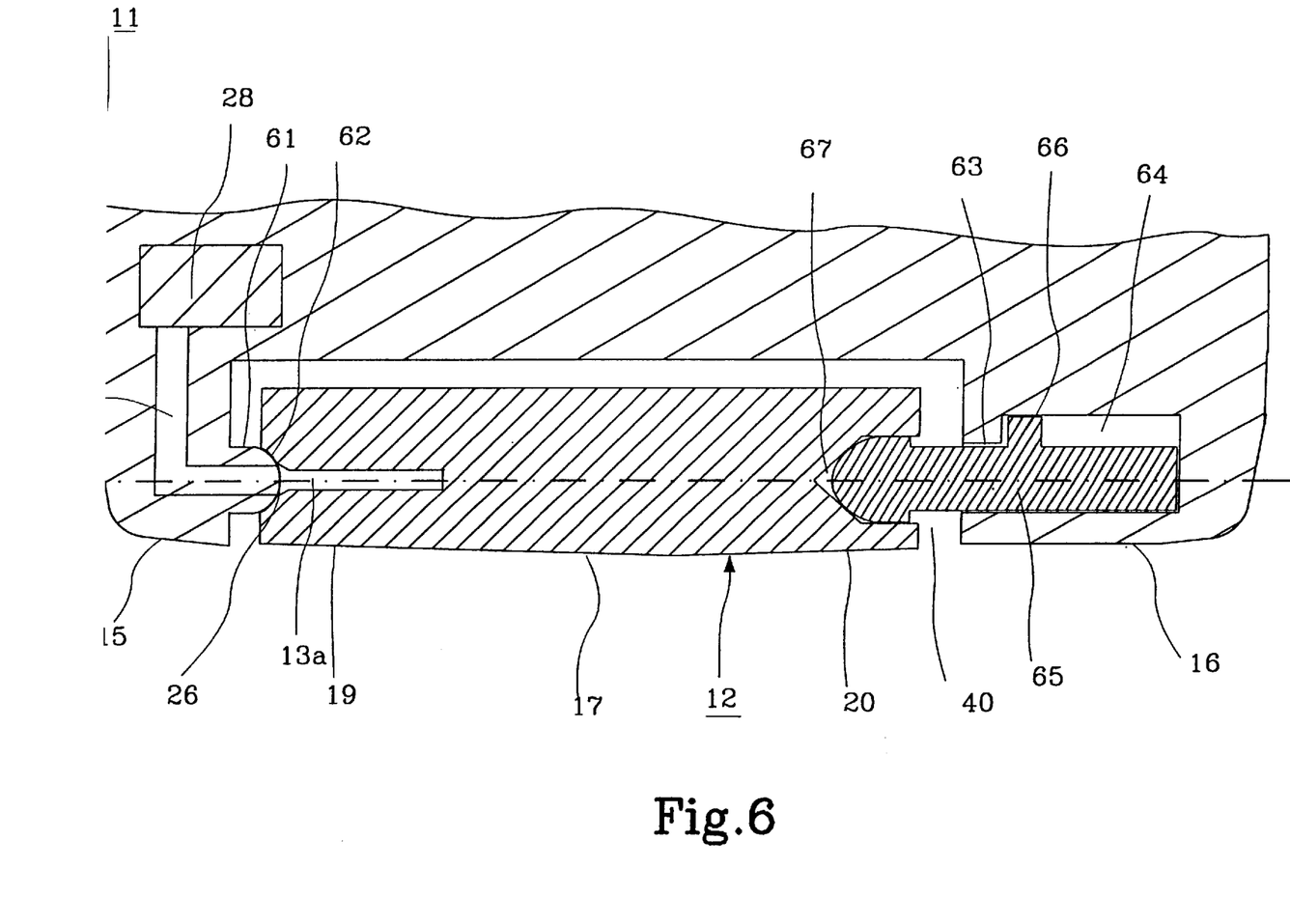
FIG. 6 shows in cross-section a further embodiment of a three-part hinge mechanism according to the invention.

FIG. 6 shows a further alternative embodiment of a three-part hinge mechanism comprising two outer hinge parts and an inner hinge part, where the sound guide joint is arranged in a pivot point for the flip part according to the invention. The same reference numerals have partially been used as in FIG. 3.

In the present case the two outer hinge parts 15 and 16 are comprised in the lower part of the communication unit 11, whereby the inner hinge part 17 is comprised in the flip part 12. A first shaft element 61 with a hemispherical end projects out of the first outer hinge part 15. A first end 19 on the inner hinge part 17 comprises a hemispherical first cavity 62 in which the first shaft element 61 is fitted. The hinge mechanism can thereby accommodate any possible radial play when the flip part rotates in relation to the communication unit.

The sound guide joint is comprised in the first pivot point 26 for the flip part, between the end surface of the first shaft element 61 and the bottom surface of the cavity 62, which surfaces are each other's opposite surfaces. A first sound guide part 13a guides from the flip part to the bottom surface of the cavity 62, and a second sound guide part 13b leads from the end surface of the shaft element 61 to a microphone 28 inside the communication unit 11. The second outer hinge part 16 comprises a hole 63 which leads into a cavity 64. In the cavity and partly extending out of the hole, in the direction of the pivot axis, towards the second end 20 of the inner hinge part 17, is loosely arranged a second shaft element 65. The second shaft element is made of some resilient compressible material, such as e.g. rubber. The projecting end of the second shaft element 65 in the present case is U-shaped. The second shaft element is movable in the axial direction but is prevented by a projecting flange part 66 from moving too far out of the second outer hinge part 16. The projecting flange part 66 and the cavity 64 are so shaped that the projecting flange part 66 prevents the shaft element 65 from rotating around the pivot axis relative to the second outer hinge part 16.

The second end 20 of the inner hinge part 17 comprises a V-shaped cavity 67 into which the U-shaped end of the second shaft element 65 is fitted.

The resilient shaft element presses the second end 20 of the inner hinge part 17 in the direction of the pivot axis away from the outer hinge part 16. The first end 19 of the inner hinge part 17 thereby presses towards the first outer hinge part 16, whereby the two opposing surfaces in the sound guide joint are pressed against each other so that a tight sound guide joint is achieved.

Also in this example, because of the force from the resilient shaft element, a free space 68 is formed between the second outer hinge part 16 and the second end 20 of the inner hinge part 17. By pressing together the second shaft element 65, the flip part 12 can be removed from, and attached to, the communication unit 11 in the same way as described above.

There are further alternative embodiments of three-part hinge mechanisms in accordance with the invention. As is evident from the embodiments already described, the outermost hinge parts can be placed on the flip part, whereby the inner hinge part is placed on the communication unit, or vice versa. A first shaft element rotatably connects the first outer hinge part to a first end of the inner hinge part, and a second shaft element rotatably connects the second outer hinge part to a second end of the inner hinge part.

The first shaft element can project out of the first outer hinge part or out of the first end of the inner hinge part, whereby the hinge part towards which the first shaft element projects, comprises a cavity in which the shaft element is fitted. Between the end surface of the first shaft element and the bottom surface of the first cavity, in the pivot point for the flip part, the sound guide joint is arranged. In this way the sound guide parts are connected to each other irrespective of which pivot position the flip part takes up relative to the communication unit. The first shaft element should be immovable relative to the hinge part from which it projects.

It is also conceivable that the first shaft element is allowed to move in the direction of the pivot axis, whereby the sound guide joint still remains tight. A new problem then occurs, viz. how the sealing between the second sound guide part and the microphone shall be ensured.

The first shaft element can, for example, be formed as a cylindrical pin, or with a hemispherical, V-shaped or U-5 shaped end. If the shaft element is V- or U-shaped, the first cavity can comprise a V- or U-shaped notch so that a male-female connection is achieved, as described above.

The second shaft element can itself be compressibly resilient, in the direction of the pivot axis, or be arranged in contact with a resilient element or in contact with a movable element which in turn is subjected to a resilient force. The resilient element and the second shaft element need not be arranged at the same hinge part. If they are arranged at the same hinge part, the second shaft element is axially movable so that it can take up the force from the resilient element, but is not rotatable relative to the hinge part at which it is arranged. In order to prevent the movable shaft element from rotating relative to the hinge part at which it is arranged, the shaft element comprises some locking arrangement, e.g. a flange, a locking hook or a shoulder. The locking arrangement can also be formed so that it prevents the shaft element from moving completely out of its hinge part. For example, the second shaft element can project from the second hinge part, whereby a suitable cavity in the inner hinge part can be comprised in a resilient or movable element, as described above.

The projecting part of the second shaft element can, in combination with the second cavity, be shaped as a male-female connecting element. If the flip part is to take up a precise folded-out position and folded-in position, the second shaft element can have a V- or U-shaped end according to what has been said above about male-female connecting elements. If the flip part does not need to take up precise stop positions, the second shaft element can, for example, be shaped as a projecting, cylindrical pin.

If the flip part is to be easily removed and fixed onto the communication unit, there must be a free space between the second outer hinge part and the inner hinge part. The width of the free space is determined by the spring force, the projecting length of the second shaft element and the depth of the cavity in the second outer hinge part. The first outer hinge part can be somewhat flexible, and therefore the width of the free space does not need to be greater than the depth of the cavity. The exact values of these quantities are a question of implementation.

The hinge mechanism according to the invention is not limited to comprising three hinge parts and two shaft elements. A hinge mechanism comprising five hinge parts and two to four shaft elements, which hinge parts and shaft elements being arranged along the pivot axis for the flip part, is for example also possible according to the invention.

Figure 7:
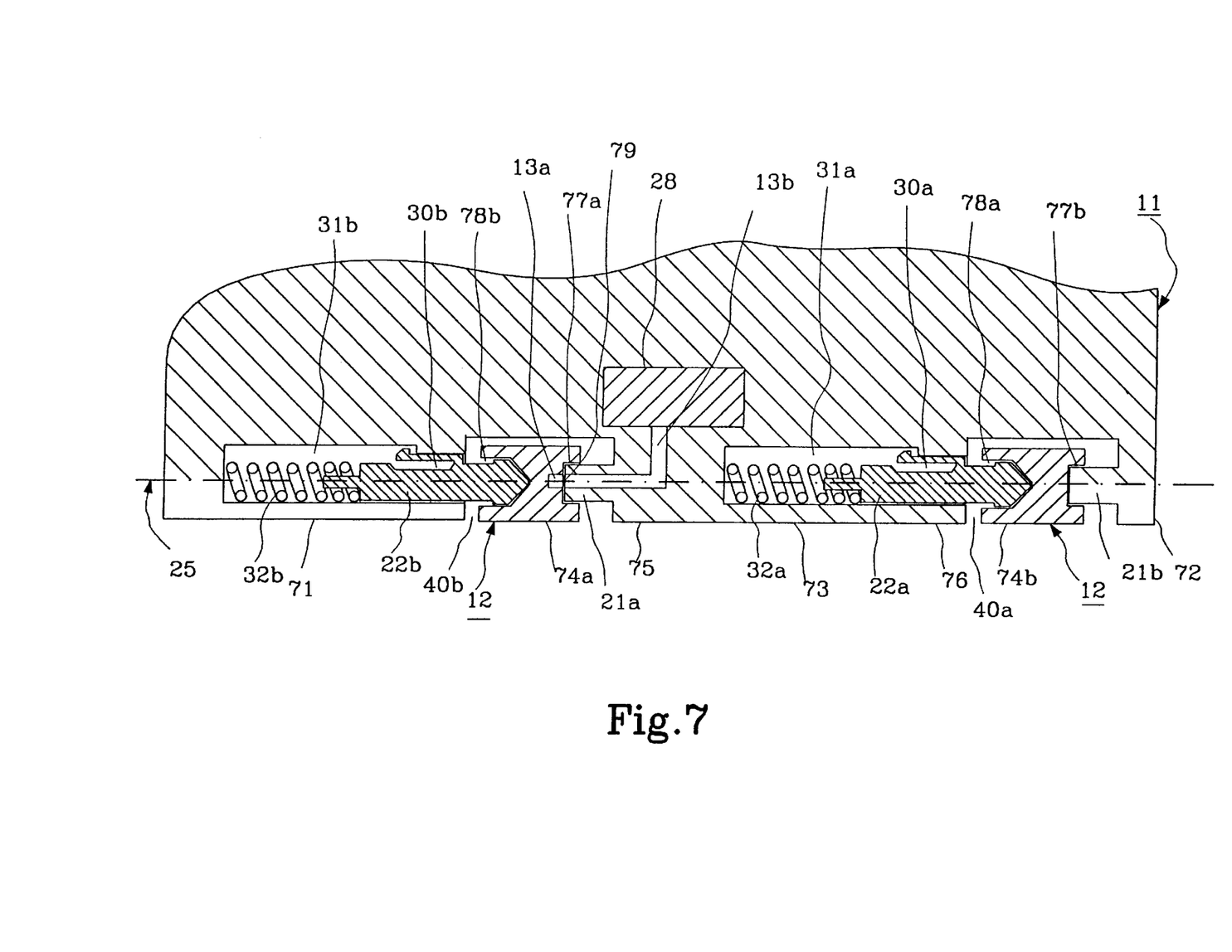
FIG. 7 shows in cross-section an embodiment of a five-part hinge mechanism according to the invention.

FIG. 7 shows an embodiment of a five-part hinge mechanism with four shaft elements according to the invention. Certain reference numerals are the same as in FIG. 3.

The communication unit comprises a first and a second outer hinge part 71 and 72 and a first inner hinge part 73 with a first and a second end 75 and 76. The flip part 12 comprises a second and a third inner hinge part 74a and 74b. The second inner hinge part 74a is fitted in between the first outer hinge part 71 and the first end 75 of the first inner hinge part 73. The third inner hinge part 74b is fitted in between the second end 76 of the first inner hinge part 73 and the second outer hinge part 72. In the present example, the flip part 12 has four pivot points, one between each hinge part. The sound guide joint is arranged in the pivot point 79 between a second end of the second inner hinge part 74a and the first end 75 of the first inner hinge part 73.

The first inner hinge part is similarly shaped to the inner hinge part in FIG. 3. A first axially movable plunger 22a is influenced by a first spring 32a, and the plunger projects out of the second end 76 of the first inner hinge part. A first shaft pin 21a projects from the first end 75 of the first inner hinge part 73. A second sound guide part 13b runs through the shaft pin into a microphone 28.

In a second end of the second inner hinge part 74a there is a cavity 77a, in which the first shaft pin is fitted. The third inner hinge part 74b comprises in a first end a V-shaped notch 78a in which the first plunger 22a is fitted.

The first outer hinge part 71 comprises a second plunger 22b, which is arranged in contact with a second spring 32b, in the same way as described above in connection with the first plunger 22a. The first end of the second inner hinge part 74a comprises a V-shaped notch 78b in which the second plunger 22b is fitted.

The second outer hinge part 72 comprises a rigid projecting second shaft pin 21b, which is fitted into a notch 77b comprised in the second end of the third inner hinge part 74b.

The plungers 22a and 22b cooperate in order to press together the sound guide joint in the same way as described in the case with one plunger. It is also possible to have only one shaft element which is influenced by a resilient force, whereby the other shaft elements can be fixed. In the example described in FIG. 7, the pressure on the opposing surfaces in the sound guide joint is increased compared to if one plunger should be used.

Figure 8:
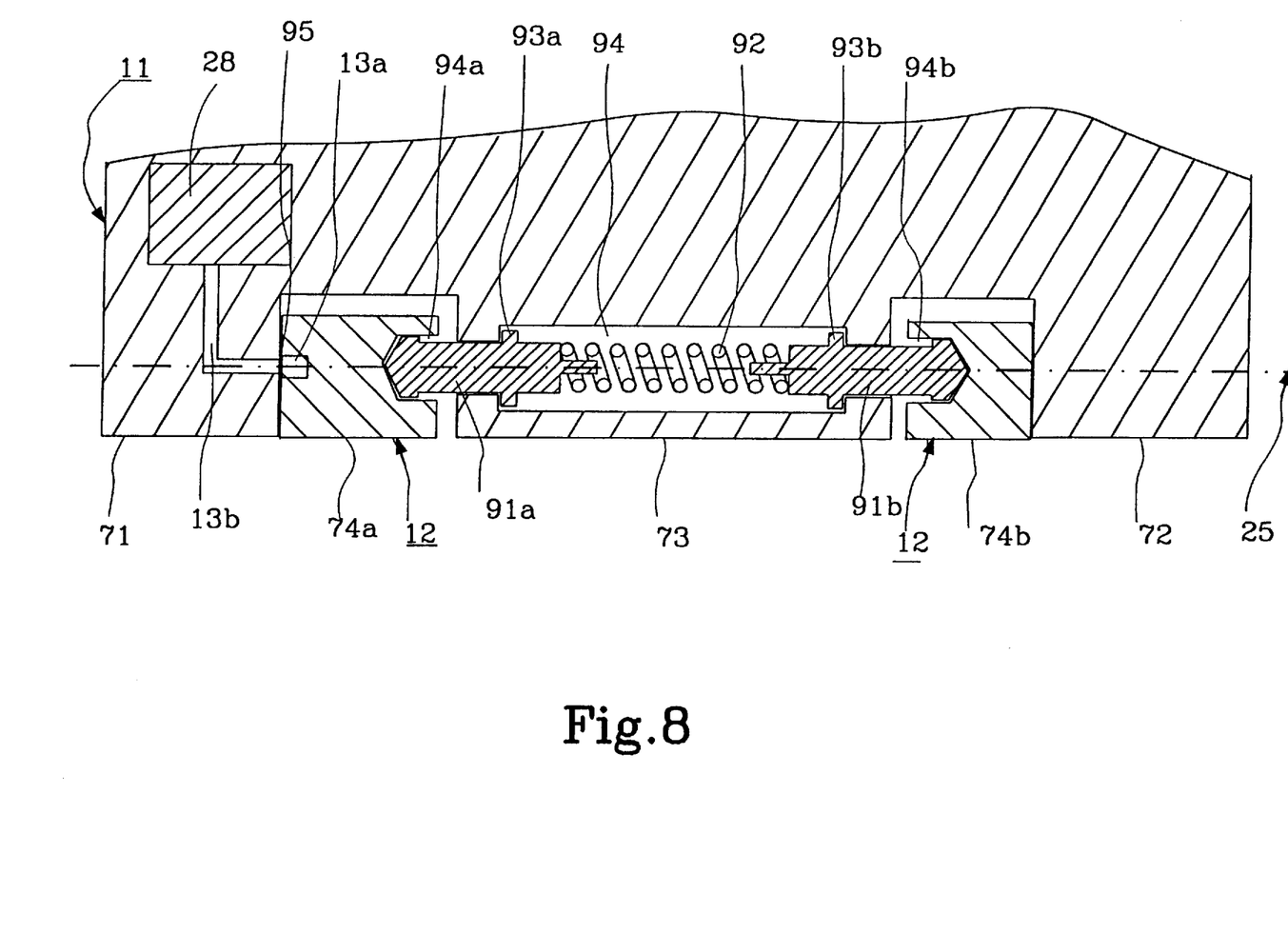
FIG. 8 shows in cross-section a further embodiment of a five-part hinge mechanism according to the invention.

FIG. 8 shows a further embodiment of a five-part hinge mechanism comprising two shaft elements according to the invention. The five hinge parts have the same reference numeral as in the previous case.

The first inner hinge part 72 comprises a through-cavity 92 with the pivot axis 25 as a center line. At each of the first and second ends 75 and 76 of the inner hinge part, a respective movable shaft element 91a and 91b in the form of a V-shaped plunger projects out of the cavity. Between the two plungers 91a and 91b there is arranged a resilient element 92 in the form of a helical spring so that it presses the two plungers in opposite directions out of the first inner hinge part 72. A respective flange part 93a and 93b arranged on each of the plungers prevents them from rotating relative to the first inner hinge part and from moving completely out of the same.

A second end of the inner hinge part and a first end of the third inner hinge part each comprise a V-shaped notch 94a and 94b in which the respective V-shaped plungers 91a and 91b are fitted.

The sound guide joint is arranged in a first pivot point 96 for the flip part between the end surface of the first outer hinge part and the first end surface of the second inner hinge part, which form opposing surfaces to each other.

When the two plungers 91a and 91b are pressed out of the first inner hinge part 72, they press the two opposing surfaces towards each other forming a tight sound guide joint. In this example the force from the two plungers is also increased compared to when one plunger is used.

In analogy with that what is said above concerning a three-part hinge arrangement, the hinge parts can be inversely arranged on the flip part and the communication unit. The shaft element can be comprised in some of the hinge parts between which there is a pivot point. The shaft elements and the resilient element can be shaped according to what has been described in the case of three-part hinge mechanisms. In the case of five-part hinge mechanisms, there can be two, three or four shaft elements.

The hinge mechanism can thus be shaped with a different number of hinge parts and with a different number of shaft elements. The essential thing according to the invention is that the sound guide is divided between a surface in the flip part and a surface in the communication unit, which surfaces are each other's opposing surfaces, whereby the sound guide joint is arranged in a pivot point for the flip part relative to the communication unit. Irrespective of the pivot point for the flip part relative to the communication unit, the sound guide parts will be connected to each other. The hinge mechanism further comprises at least two shaft elements which pivotally join together the flip part with the communication unit. At least one of the shaft elements is in itself resilient, or is arranged so that it will be influenced by the force from a resilient element. The resilient force influences this shaft element so that it in turn presses the opposing surfaces towards each other so that the sound guide joint is tight, irrespective of the pivot position of the flip part relative to the communication unit.

The shaping of the hinge mechanism can be modified within the scope of the invention. An average skilled person in the field can see that there are many different embodiments of a hinge mechanism according to the invention.

The invention has been described above where the communication unit is a mobile telephone with radio connection to base stations all over the country. The communication unit can, for example, equally well be a wireless telephone or a walkie talkie. All these types of speech communicators are being developed and are becoming smaller and smaller.

I claim:

1. Hinge mechanism for a folding flip part (12) for a communication unit (11) for achieving a sound-tight sound guide joint in a sound guide (13a, 13b) split between the flip part and the communication unit, at the same time as the flip part can pivot relative to the communication unit, wherein the sound guide is arranged from its first part (13a) from a sound input (14) on the flip part via its second part (13b) to a microphone (28) in the communication unit, and wherein the flip part (12) can be rotated relative to the communication unit (11) around at least two pivot points (26, 27, 79, 95), which together define a pivot axis (25), whereby at least two projecting shaft elements (21, 22, 21a, 21b, 22a, 22b, 51, 53, 61, 65, 91a, 91b) each are arranged in a respective pivot point in order to pivotally connect the flip part to the communication unit, characterized in that the sound guide joint is arranged by a first pivot point (26, 79, 95) for the flip part, between a first opposing surface on the flip part (12) and a second opposing surface on the communication unit (11), and that at least a first of said at least two shaft elements (22, 22a, 22b, 53, 65, 91a, 91b) is influenced by a compressive resilient force in the direction of the pivot axis, so that a second (21, 53) of at least two shaft elements in its turn produces a force on said first opposing surface in relation to said second opposing surface, whereby said first and second sound guide parts (13a, 13b) are tightly connected to each other independent of the pivot position of the flip part.

2. Hinge mechanism according to claim 1, characterized in that the second (22b, 91b) of said at least two shaft elements is influenced by a compressive resilient force in the direction of the pivot axis, in order to increase said pressure on said first opposing surface in relation to said second opposing surface.

3. Hinge mechanism according to claim 1, characterized in that said shaft element (22, 22a, 22b, 65, 91a, 91b), which produces the force on said opposing surfaces, projects out of a hinge part (17, 16, 71, 73) comprised in the communication unit (11), whereby the flip part (12) comprises an opposing hinge part (16, 17, 74a, 74b) comprising a notch (24, 67, 78a, 78b, 94a, 94b) in which the shaft element is fitted, whereby a second pivot point (27) for the flip part is situated between the bottom surface of the notch and the projecting end surface of the shaft element, so that the shaft element (22, 22a, 22b, 65, 91a, 91b) presses against the notch (24, 67, 78a, 78b, 96a, 96b), whereby the flip part (12) is pressed in the direction of the pivot axis so that the two opposing surfaces are pressed together.

4. Hinge mechanism according to claim 1, characterized in that said shaft element (53), which produces the force on said opposing surfaces, projects out of a hinge part (16) comprised in the flip part (12), whereby the communication unit (11) comprises an opposing hinge part (17) with a notch (55) in which the shaft element (53) is fitted, whereby a second pivot point for the flip part is situated between the bottom surface of the notch (55) and the projecting end surface of the shaft element (53), so that the shaft element (53) is pressed by the spring force towards the notch (55), whereby the flip part (12) is pressed in the direction of the pivot shaft, so that the two opposing surfaces are pressed together.

5. Hinge mechanism according to claim 1, characterized in that said shaft element (53), which produces the pressure on said opposing surfaces, is rigidly arranged and is fitted into a notch (55) which is movable in the direction of the pivot axis, which notch (55) is influenced by a resilient compressive force in the direction of the pivot axis.

6. Hinge mechanism according to claim 1, characterized in that said shaft element (65), which produces the force on said opposing surfaces, is itself a movable resilient compressive element in the direction of the pivot axis.

7. Hinge mechanism according to claim 1, characterized in that said shaft element (22, 22a, 22b, 91a, 91b), which produces the pressure on said opposing surfaces, is movable in the direction of the pivot axis and is arranged in contact with a resilient compressive element (32, 32a, 32b, 92).

8. Hinge mechanism according to claim 7, characterized in that the shaft element (22, 22a, 22b, 92) is a plunger.

9. Hinge mechanism according to claim 5, characterized in that the resilient compressive element (32, 32a, 32b, 92) is a mechanical spring.

10. Hinge mechanism according to claim 6, characterized in that the resilient compressive element (65) is formed of a rubber material.

11. Hinge mechanism according to claim 9, characterized in that said shaft element (22, 22a, 22b, 91a, 91b, 65) comprises a locking arrangement (35, 66, 93a, 93b) which prevents the shaft element from rotating around the pivot axis relative to the hinge part from which it projects.

12. Hinge mechanism according to claim 9, characterized in that said shaft element (22, 22a, 22b, 91a, 91b, 65) comprises a locking arrangement (35, 66, 93a, 93b) which prevents the shaft element from moving so far in the direction of the pivot axis from the hinge part from which it projects, so that it loses contact with the hinge part.

13. Hinge mechanism according to claim 1, characterized in that a shaft element (21, 51, 61, 21a) is rigidly arranged at a hinge part (17, 15, 75) comprised in the communication unit (11) in the first pivot point (26, 79) for the flip part, wherein the flip part (12) comprises an opposing hinge part (15, 17, 74a) with a notch (23, 52, 62, 77a) in which the shaft element is fitted, whereby the projecting end surface of the shaft element and the bottom surface of the notch form said opposing surfaces.

14. Hinge mechanism according to claim 1, characterized in that a shaft element is rigidly arranged by a hinge part in the flip part, in the first pivot point for the flip part, whereby the communication unit comprises a hinge part with a notch in which the shaft element is fitted, wherein the projecting end surface of the shaft element and the bottom surface of the notch form said opposing surfaces.

15. Hinge mechanism according to claim 1, characterized in that the respective shaft element can only rotate around the pivot axis relative to the hinge part towards which it projects.

16. Hinge mechanism according to claim 1, characterized in that at least one of said shaft elements (22, 51, 53, 65, 22a, 22b, 91a, 91b) in combination with the notch (24, 52, 55, 67, 78a, 78b, 94a, 94b) in which the shaft element is fitted, forms a male-female connection.

17. Hinge mechanism according to claim 16, wherein the projecting end of the shaft element (22, 51, 53, 22a, 22b, 91a, 91b) is V-shaped, and the notch (24, 52, 55, 78a, 78b, 94a, 94b) in which it is fitted comprises at least one V-shaped groove.

18. Hinge mechanism according to claim 17, wherein the V-shaped end of the shaft element (22, 51, 53, 22a, 22b, 91a, 91b) is fitted in the V-shaped groove in the notch (24, 52, 55, 78a, 78b, 94a, 94b) when the flip part takes up a defined folded-out position.

19. Hinge mechanism according to claim 1, characterized in that at least one of said shaft elements (61) has a spherical projecting end, whereby the notch (62) in which the shaft element is fitted has a corresponding shape.

20. Hinge mechanism according to claim 1, wherein it comprises a first shaft element (21, 51, 61) and a second shaft element (22, 53, 65), characterized in that the hinge mechanism further comprises a first outer hinge part (15), a second outer hinge part (16), which both are comprised in one of the flip part (12) or the communication unit (11), and an inner hinge part (17) which is arranged between the two outer hinge parts and is comprised in the other one of the flip part or the communication unit, whereby the hinge parts (15, 16, 17) and the shaft elements (21, 51, 61, 22, 53, 65) are arranged in the direction of the pivot axis (25), whereby the hinge part, towards which the first respectively the second shaft element projects, comprises a first notch (23, 52, 62) and a second notch (24, 55, 67) respectively in which the respective shaft element is fitted, so that the first shaft element (21, 51, 61) pivotally connects the first outer hinge part (15) and a first end (19) of the inner hinge part (17), and the second shaft element (22, 53, 65) pivotally connects the second outer hinge part (16) and a second end (20) of the inner hinge part (17), whereby said first pivot point (26) is situated between the first outer hinge part (15) and the first end (19) of the inner hinge part, and a second pivot point (27) is situated between the second outer hinge part (16) and the second end (20) of the inner hinge part.

21. Hinge mechanism according to claim 20, characterized in that the inner hinge part (17) comprises a resilient element (32) which is compressible in the direction of the pivot axis and which is arranged to exert pressure in the direction of the pivot axis towards the second outer hinge part (16), so that the second outer hinge part is pressed out from the second end (20) of the inner hinge part, whereby the first outer hinge part presses towards the first end of the inner hinge part, whereby the two opposing surfaces in the sound guide joint are pressed towards each other, so that the sound guide joint is pressed together and becomes sound-tight.

22. Hinge part according to claim 20, characterized in that the second outer hinge part (16) comprises a resilient element (65) which is compressible in the direction of the pivot axis and which is arranged to exert pressure in the direction of the pivot axis towards the second end of the inner hinge part (17), so that the inner hinge part (17) is pressed in the direction of the pivot axis from the second outer hinge part (16), whereby the first end (19) of the inner hinge part (17) presses towards the first outer hinge part (15), whereby the two opposing surfaces in the sound guide joint are pressed towards each other so that the sound guide joint is pressed together and becomes sound-tight.

23. Hinge mechanism according to claim 21, characterized in that a free space (40) is formed between the second hinge part (16) and the second end (20) of the third hinge part when the second hinge part is influenced by the force from the resilient element (32), whereby the flip part (12) can be removed from the communication unit (11) when the free space (40) is compressed.

24. Hinge mechanism according to claim 1, characterized in that the hinge mechanism comprises a first outer hinge part (71) and a second outer hinge part (72) as well as a first inner hinge part (73), which all three are comprised in one of the communication unit (11) or the flip part (12), and that a second inner hinge part (74a) and a third inner hinge part (74b) both are comprised in the other of the communication unit (11) or the flip part (12), whereby the second inner hinge part (74a) is fitted between the first outer hinge part (71) and a first end of the first inner hinge part (73), and whereby the third inner hinge part (74b) is fitted between a first end of the inner hinge part (73) and the second outer hinge part, whereby the flip part rotates in relation to the communication unit at a pivot point between the respective hinge part, whereby the sound guide joint is arranged in one of the pivot points (79, 95).

* * * * *